United States Patent [19]
Collins et al.

[11] Patent Number: 5,881,464
[45] Date of Patent: Mar. 16, 1999

[54] LINE HEAD FOR FLEXIBLE LINE TRIMMER

[75] Inventors: Imack Collins, Shreveport; Robert T. Cline, Bethany; Lloyd H. Tuggle, Shreveport, all of La.

[73] Assignee: WCI Outdoor Products, Inc., Cleveland, Ohio

[21] Appl. No.: 670,143

[22] Filed: Jun. 27, 1996

Related U.S. Application Data

[63] Continuation of Ser. No. 225,375, Apr. 8, 1994, abandoned.

[51] Int. Cl.$^6$ .............. A01D 34/68; A01G 3/06
[52] U.S. Cl. .............. 30/276; 56/12.7; 242/597.4
[58] Field of Search .......... 30/276, 347; 56/12.7; 242/597.4

[56] References Cited

U.S. PATENT DOCUMENTS

| | | | |
|---|---|---|---|
| Re. 32,629 | 3/1988 | Baba et al. | 30/276 |
| 1,319,429 | 10/1919 | Spiro . | |
| 2,087,002 | 7/1937 | Miehle, Jr. . | |
| 3,502,279 | 3/1970 | Bundschuh et al. . | |
| 4,089,114 | 5/1978 | Doolittle et al. | 30/276 |
| 4,124,938 | 11/1978 | Ballas, Sr. | 30/276 |
| 4,134,204 | 1/1979 | Perdue | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,183,138 | 1/1980 | Mitchell et al. | 30/276 |
| 4,189,830 | 2/1980 | Pittinger, Jr. | 30/276 |
| 4,202,094 | 5/1980 | Kalmar | 30/276 |
| 4,203,212 | 5/1980 | Proulx | 30/276 |
| 4,236,309 | 12/1980 | Cayou | 30/276 |
| 4,259,782 | 4/1981 | Proulx | 30/276 |
| 4,269,372 | 5/1981 | Kwater | 242/129.8 |
| 4,281,505 | 8/1981 | Fuelling, Jr. et al. | 30/276 X |
| 4,285,127 | 8/1981 | Zerrer et al. | 30/276 |
| 4,369,577 | 1/1983 | Gise et al. | 30/276 |
| 4,412,382 | 11/1983 | White, III | 30/276 |
| 4,490,910 | 1/1985 | Mattson et al. | 30/276 |
| 4,524,515 | 6/1985 | Oberg | 30/276 |
| 4,557,052 | 12/1985 | Baba et al. | 30/276 |
| 4,566,189 | 1/1986 | Muto | 30/276 |
| 4,584,771 | 4/1986 | Tillotson | 30/276 |
| 4,633,588 | 1/1987 | Pittinger, Jr. | 30/347 |
| 4,672,798 | 6/1987 | Ota | 30/276 X |
| 4,702,005 | 10/1987 | Pittinger, Sr. et al. | 30/276 |
| 4,790,071 | 12/1988 | Helmig et al. | 30/276 |
| 4,823,465 | 4/1989 | Collins | 30/276 |
| 4,959,904 | 10/1990 | Proulx | 30/276 |
| 5,060,384 | 10/1991 | Everts | 30/276 |

*Primary Examiner*—Eugenia A. Jones
*Attorney, Agent, or Firm*—Marc A. Hubbard; Munsch Hardt Kopf & Harr, P.C.

[57] ABSTRACT

A "bump-feed" type line head (108) and replaceable spool (116) for a flexible line trimmer are specially adapted for removing and mounting the spool in a single manual movement to the line head to facilitate spool and line replacement. The line head includes a "U" shaped retention spring (118) mounted within a hub in the line head on with the spool is journalled. The spring includes knob-shaped sections (122) protruding through the hub, beneath the spool, for retaining the spool on the hub without interfering with a bump-feed indexing means. Pulling the spool from or pushing the spool onto the hub tends to deflect the knobs inwardly, allowing axially movement of the spool on the hub. The compression force of the spring is set to be sufficient to retain the spool on the hub during normal operation but not to withstand force manually applied in an axial direction to the reel. The spool includes an integrally formed reel (116) and an integrally formed button (130) connected in a single movement to the bottom of the reel using undercut surfaces (136)(138), forming a cavity having a radius sufficient to accommodate extension of the knobs beneath the spool.

18 Claims, 4 Drawing Sheets

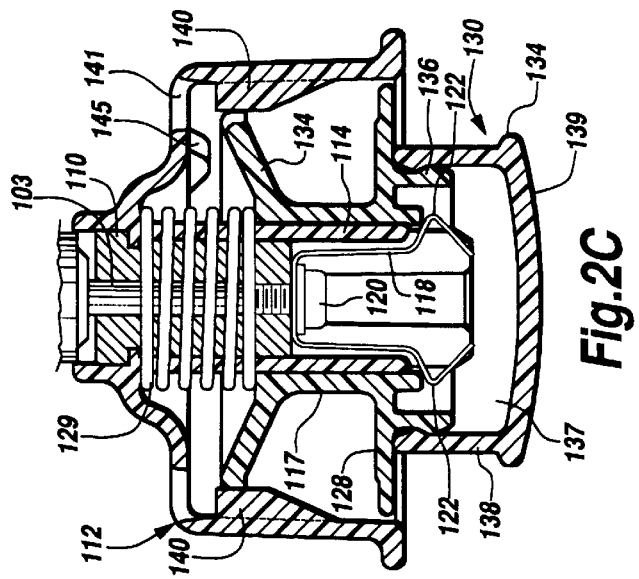
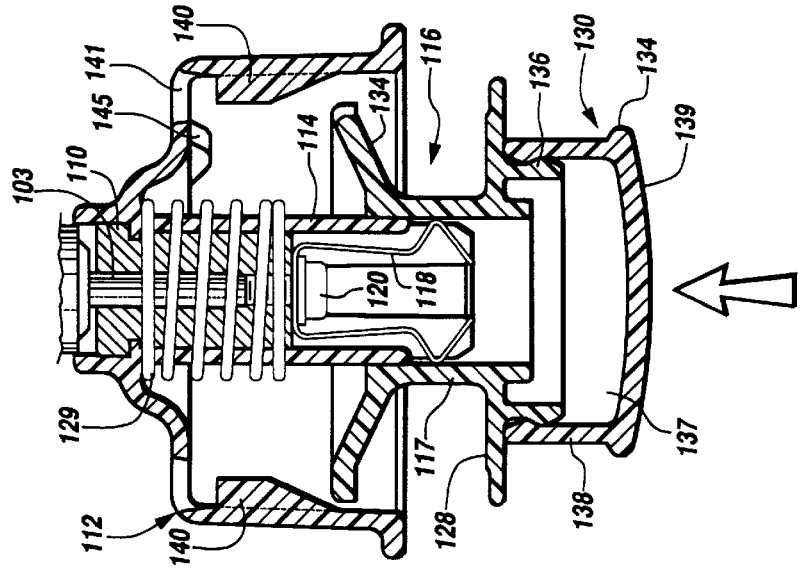
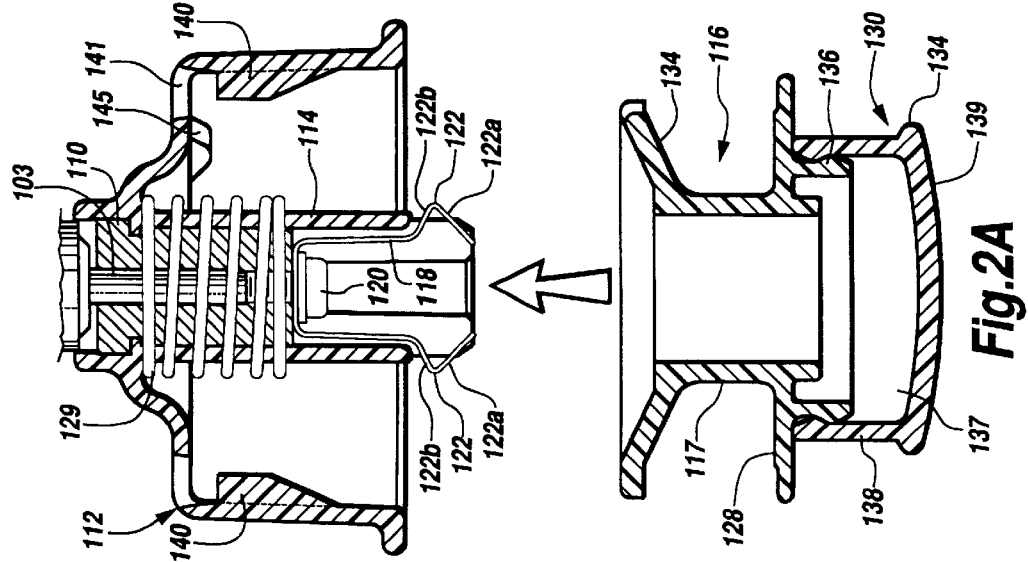

LINE HEAD FOR FLEXIBLE LINE TRIMMER

This Application is a continuation of application Ser. No. 08/225,375, filed Apr. 8, 1994, now abandoned.

FIELD OF INVENTION

The invention relates generally to vegetation cutters and more particularly to line heads for flexible line trimmers.

BACKGROUND OF THE INVENTION

Flexible line trimmers are well-known and widely used devices for cutting soft vegetation. The cutting element is a length of flexible line, typically a monofilament, that is flailed against the vegetation by rapidly spinning the line with a motor. The line is strong enough to cut relatively soft vegetation, but it is not strong enough to cause serious injury to a person or to damage woody stemmed plants, trees or structures without breaking. Thus, flexible line trimmers tend to be safe to operate and are well suited for trimming grass and other vegetation adjacent to trees, sidewalks and houses, where a steel element or blade or other type of cutting element may cause damage or be damaged during normal use. Except for the fact that the line breaks frequently even during normal use, they are easy to use and tend to be relatively inexpensive and light-weight.

To overcome what is generally perceived to be the major deficiency of flexible line trimmers, a great deal of effort has been directed in the past to methods of making replenishing broken cutting line more convenient for users without complicating and increasing the cost of a line trimmer. The standard and currently most frequently employed approach is to sell a supply of replacement line on a spool and have the user mount it in a line head that is coupled to the motor of the line trimmer. A line head typically includes a hub, coupled to the output shaft of a motor, and a housing or shroud extending outwardly from the hub and down around the spool to protect the spool from dirt and debris. The user places the spool on the hub, feeding a small length of line through an opening in the housing, and places a cover over the spool to retain and protect the spool within the line head. The spool is locked to the hub so that rapid spinning of the line head fails the line. When line breaks, the spool is unlocked and spun relative to the hub to unwind line through the opening.

Several methods have been used to lock and unlock the spool against the hub. Early line heads used a manual release mechanism. To replace line, the trimmer was stopped and turned upside down. The locking mechanism was released manually and the spool turned to unwind and feed line. To avoid having to stop and turn the trimmer upside to feed line, most current line heads have a "bump-feed" mechanism that allows the user to feed a predetermined amount of line while the head is spinning by hitting a button on the bottom of the line head against the ground. More recently, line heads have features which automatically unlock the spool without any intervention of the user. Generally, these heads utilize the centrifugal force acting on the spinning head or flailing line to lock or to release the spool to rotate when the line becomes short or when the head accelerates upon start-up.

There are numerous examples of bump-feed mechanisms. Most of these mechanisms have an indexing means that permits the spool to rotate in the line head a predetermined amount relative to the hub or shroud when the line head is bumped against the ground. Bumping the button on the bottom releases a locking mechanism, allowing the spool to relatively rotate a predetermined angle on the hub as the whole hub assembly continues to rotate, and then locks the spool. The force to produce the relative rotation of the spool is provided by the centrifugal force of the portion of line outside the head. A predetermined length of line thus unwinds and is played out through the opening in the hub.

One type of indexing means includes a series of detentes between the spool and line head, usually formed by a series of tabs on the spool that cooperate with a series of stepped stops on either the outside surface of the hub or the inside surface of the housing. The spool is biased downwardly on the hub by a spring so that its tabs engage the lower set of stops on the hub or housing, thus locking the spool in a normal operating position. Bumping the line head against the ground displaces the spool axially upward to a second position so that its teeth clear the top of the series of stops. When the tapping action is completed, the spool is then free to rotate relative to the hub until the tabs on spool engage the stepped-up set of stops. The spring then forces the spool down where it continues to rotate on the hub until the tabs engage the lower set of stops.

Bump-feed line heads provide a great deal of convenience for the user. However, once a supply of flexible line on a spool is exhausted, the line trimmer must be turned on its side or upside down and held in an unwieldy position to replace the empty spool with another spool pre-wound with line and reattach the cover. A cover of a line head is often attached to the line head in a manner that demands such dexterity to unfasten and remove that many users become frustrated by the task of replacing a spool. The indexing mechanism of the line head unfortunately complicates and limits the choices of methods to retain spool in the line head. In one approach to make spool replacement easier, the spool is located in the handle of the trimmer, near the user. Examples of this configuration are illustrated in U.S. Pat. No. 4,369,577 of Gise et al. and U.S. Pat. No. 4,285,128 of Schnell et al. However, the line must then be fed through the handle shaft of the trimmer motor and then through line head, replacing one potentially frustrating task with another. U.S. Pat. No. 4,633,588 to Pittinger, Jr. retains the spool in the line head, but attempts to provide for an improved spool fastening mechanism that does not require removal of a cover. Instead, its fastening mechanism is released through a pin extending through the bottom of the spool. This pin-actuated release mechanism has, however, several disadvantages. It has several moving parts and is relatively complicated. It thus tends to be more expensive to manufacture and is more susceptible to sticking or interference from accumulation of dirt and debris around the pin and the fastening mechanism. The spool could thus be prematurely released during use or the pin become very difficult to push to release the spool.

SUMMARY OF THE INVENTION

The invention is a line head for a flexible line trimmer having a spool retention mechanism that allows a spool to be removed from a line head in a single movement by a user simply pulling down on the spool. The spool may also be replaced in a single movement by pushing the spool into the line head. No fasteners need to be released or covers removed. Furthermore, the spool interaction mechanism is simple and inexpensive to manufacture and assemble and is less susceptible to adverse effects of dirt and debris.

According to one aspect of the invention, a line head includes a retention member mounted through a hub in the center of the line head. The retention member extends radially outwardly from the hub under the spool and engages the bottom of the spool. The spool is thus free to rotate and to move upwardly on the hub. Manually pushing a spool onto or pulling the spool off of the hub depresses the retention member, permitting the spool to be mounted and released in a single movement. Also the centrifugal force acting on the retention member during operation assures the retention of the spool. To retain the spool on the hub during operation of the line trimmer, the retention member is biased so that forces applied to the spool during normal operation tend to be insufficient to depress the member. However, a person having ordinary strength may pull the spool from or push the spool onto the hub.

In accordance with another aspect of the invention, a spool and a button are separately injection molded and then securely attached to each other in a single action during manufacture. The button cooperates with the spool to form between the bottom of the spool and the button a cavity having a radius greater than that of the hub for receiving and accommodating the retention member. The button and spool assembly for cooperating with the retention mechanism may thus be fabricated using conventional injection molding processes, without the need for additional fasteners or a multiple step assembly process. This method of joining the spool and button also creates a seal that helps to protect the retention member from interference from dirt and debris associated with use of the trimmer.

A preferred embodiment of the line head includes a hollow hub mounted on and keyed to an arbor. A U-shaped spring is attached at its bend to the bottom of the arbor. The spring's two legs extend down through the hollow center of the hub and then flare outwardly through slots in the hub and then back inwardly to form knob-shaped tabs depressible by application of pressure to the surfaces of the tabs in either direction parallel to the axis of the hub. Pushing a spool onto or pulling it from the hub depresses the tabs of the spring, releasing the spool. When the spool is fully mounted on the hub, the bottom of the spool clears the tabs, allowing the tabs to spring outward and thereby retain the spool on the hub. The "U" shaped spring is easily fabricated and installed in the hub of the line head with a screw or fastener. It also has a minimal number of moving parts or surfaces, and is thus less susceptible to adverse effects of dirt and debris normally associated with use of line trimmers.

The preferred embodiment also includes a button that spans the bottom surface of the spool to form a cavity with a radius greater than that of the hub to accommodate the tabs of the retention spring when extended. The cavity is also deep enough to accommodate the tabs when the spool is displaced by bumping it against the ground to actuate an indexing means within the line head to pay out line. The button and the spool, molded in separate processes with matching undercut surfaces, are snapped together in a single movement. The undercut surfaces help to seal the opening in the bottom of the spool to prevent dirt and debris from entering the bottom of the spool and interfering with operation of the spool retention spring.

These and other features and advantages invention are described in or will be apparent from the following detailed description of the preferred embodiment of the invention as illustrated in the accompanying drawings.

BRIEF DESCRIPTION OF DRAWINGS

FIG. 2A is a cross-section of the line head of FIG. 1, illustrating the spool and button assembly fully removed from the line head.

FIG. 2B is a cross-section of the line head of FIG. 1 that illustrates the position of the spool and button assembly as it is being removed from or inserted into the line head.

FIG. 2C is a cross-section of the line head of FIGS. 1 and 3 with the spool and button assembly fully mounted within the line head.

DESCRIPTION OF PREFERRED EMBODIMENTS

Like numbers refer to like parts in the following description.

Figure 1:
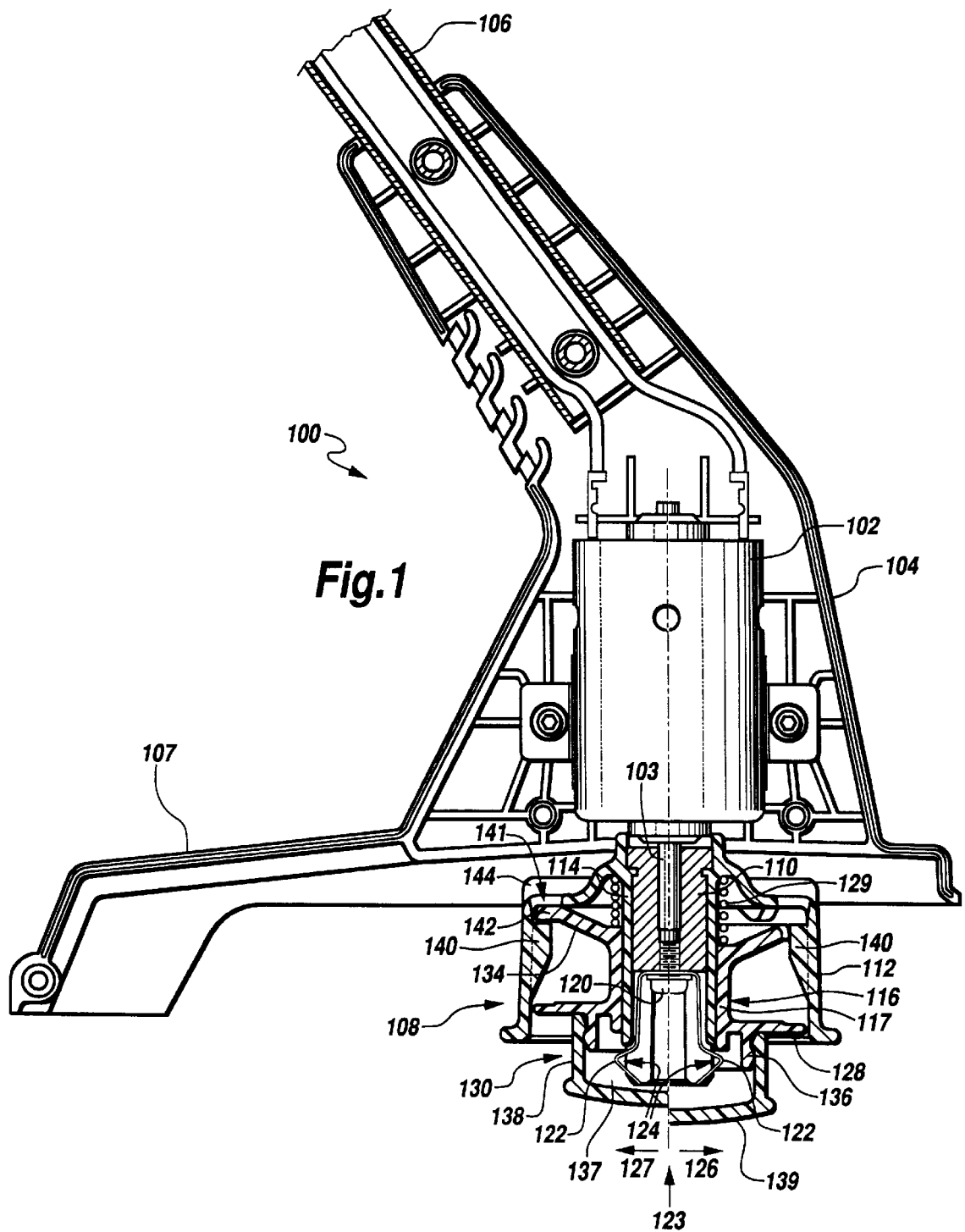
FIG. 1 is a cross-section through a motor housing section of a flexible line trimmer and a line head, the line head split along its axis of rotation to show a spool in two axially displaced operating positions.

Referring now to FIG. 1, an electric flexible line trimmer 100 includes an electric motor 102 mounted within motor housing 104. The motor housing is manufactured in two halves, the right half being removed for purposes of illustration. The motor's output shaft 103 is generally vertical with respect to the ground when the flexible line trimmer is held in a normal operating position. Tubular handle support tube 106 is attached to the upper end of the housing 104. The housing includes an integrally formed shield 107. Though not shown, mounted to the upper end of the handle support tube 106 is a handle with a trigger switch for turning on and off a flow of current to the motor and an auxiliary handle to assist in holding and maneuvering the trimmer. The electric flexible line trimmer illustrated is just one example of flexible line trimmers generally other types include those powered by internal combustion engines. Heavier engines are usually located at the opposite end of the support tube 106 for better balance and are coupled to the line head through a shaft extending through the middle of the support tube 106.

The output shaft 103 of motor 102 is coupled to a line head 108 through a metal arbor 110. The arbor includes a socket that receives the end of the output shaft 103 of the motor. The arbor is keyed and attached to a hub 114 of the line head for transmitting torque from the shaft 103 to the hub. Integrally formed with hub 114 is line head housing 112, formed from a circular skirt extending outwardly from the hub and then down around the hub. This cup-shaped housing defines a cavity in which a reel or spool 116 is mounted for rotation about the hub. The spool includes a hollow, cylindrical hub section 117 for mounting the spool on the hub 114 for rotation. The spool thus rotates on the hub about the same axis of rotation as the line head. The spool is normally wound with a supply of flexible, monofilament line (not shown). Bottom side wall 128 and top side wall 134 of the spool are integrally formed with the spool's hub 117 and assist in retaining line wound on the spool. bottom side wall 128 is solid and also forms a bottom wall of the line head housing.

Figure 5:
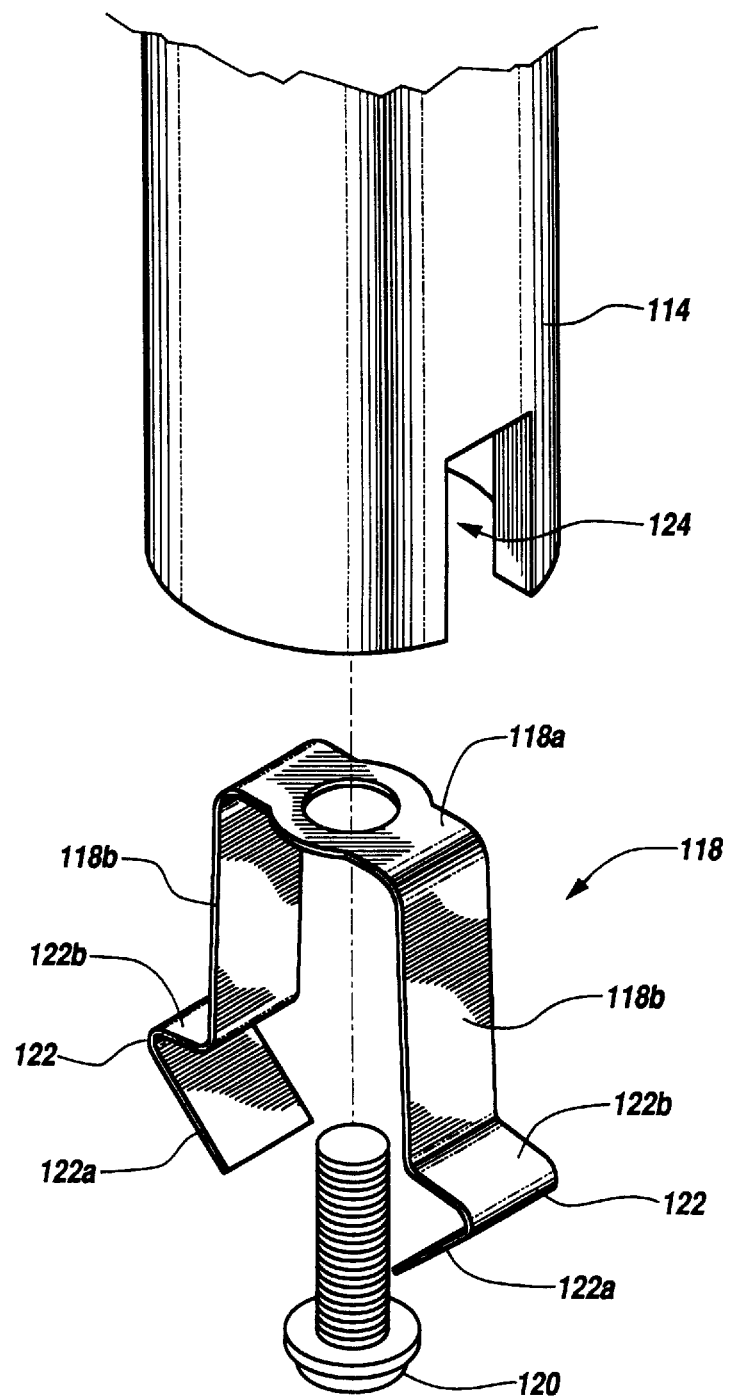
FIG. 5 is an exploded view of a spool retention assembly portion in the line head of FIG. 1.

Referring to FIGS. 1 and 5 together, the cylindrically-shaped line head hub 114 has a hollow center or bore, into which the arbor extends and in which a retention spring 118 is mounted. Retention spring 118 is a generally "U" shaped leaf spring. It has a relatively flat mid section 118a, with a hole through which a screw 120 extends to attach the spring to the arbor. It also has two downwardly extending legs 118b. The bottom portion of each leg is bent to form a knob 122. Each knob extends outwardly through slots 124 formed through the side of the hub 114. The spring 118 is slightly compressed by the inside walls of the hubs 114, providing a bias to the knobs in their fully extended position as shown. Each knob has two exterior surfaces 122a and 122b exposed when fully extended through a slot. Each surface is slanted or angled obliquely with respect to the axis of rotation of the hub, which axis is indicated by dashed line 123. A force applied to either surface that is substantially parallel to the axis of rotation of the hub generates, when combined with the ramp offered by the surfaces 122a and 122b, a force perpendicular to the axis of the hub which has a magnitude sufficient to overcome the biasing force of spring 118 tends to deflect the knobs inwardly to the point that the peak of each knob lies within the radius of the hub of the spool. The spool is thus able to be pulled off of or pushed onto the hub 114 in a single movement.

Referring now only to FIG. 1, line head 108 is illustrated split along the axis of rotation of the spool, indicated by line 123, to show it in two operating positions. Side 126 of the line shows the spool in a first normal operating position and side 127 shows it in a second, axially displaced operating position. The spool 116 is biased to its first operating position by compressed coiled spring 129. The knobs 122 abut the bottom edge of the spool hub 117 when it is in the first operating position to hold or retain the spool on the hub. Swiftly hitting or bumping button 130 against the ground axially displaces the spool to its second operating position.

The spool 116 and the button 130 are formed by separate injection molding processes and then permanently joined in a single movement. A circular ridge or rim 136 is formed on the bottom side of the spool surrounding the center of the spool. The ridge has an undercut formed on its outer circumference or surface. The radius of the ridge with respect to the axis of rotation of the hub, is large enough to accommodate the knobs 122 when fully extended below the spool. The button is circular and is generally shaped like a bowl, with a cavity 137 formed by side walls 138 extending perpendicularly upward from a bottom wall or surface 139 of the button. The bottom of the button has a convex outer surface that assists in bumping the line head when the surface of the ground is uneven or the trimmer is being held at an angle and also reduces the friction when bumped on a hard, flat surface. On the inside of the rim of the sides 138 of the button is formed an undercut that complements and mates with the undercut on the ridge 136 of the spool. During factory assembly, the spool and button are pushed together so that the undercuts on the spool and undercut on the button hook each other, thus securely attaching the spool and button in a single movement without fasteners. The hooked rims of the button and spool also seal the inside surfaces of the spool's hub, helping to prevent dirt and debris kicked up during use from interfering with rotation of the spool in the line head and its removal. The radius of the cavity 137 is greater than the radius of the hub, permitting the knobs 122 of the spring to extend radially outward beneath the spool. The depth of the cavity 137 in the button is also large enough to accommodate the knobs when the spool is displaced upwardly to the second operating position, thus permitting the spool to rotate freely. Also, if the head is used with electrically powered units as shown in FIG. 1, fins 144 are molded at the top of the hub. These fins create an air flow that cools the electric motor. Also if debris wraps around the head, it may create problems if it reaches the motor shaft. To avoid this problem, the hub is extended in such a way that shields the motor output shaft and bearing.

Referring now to FIGS. 2A, 2B and 2C, these figures illustrate spool 116, assembled with button 130, being mounted onto the hub 114 in a single movement. In FIG. 2A, the assembly is fully removed. To mount the assembly, an operator grasps the button 130, aligns the hub of the spool with the hub of the line head, and pushes the top edge of the spool's hub against the lower surface 122a of the knobs 122. The angle of the lower surface 122a with respect a lever arm extending roughly between the screw 120 (about which each leg of the retention spring bends to be compressed) and the knob is less than that of the upper surface 122b, creating greater leverage to compress the retention spring. This makes mounting the spool easier than removing it. The tab angles and the biasing force of the spring is set so that most persons have the strength to comfortably overcome the biasing force of the spring to deflect the knobs inwardly.

In FIG. 2B, knobs 122 have been fully deflected, creating sufficient clearance to permit the spool to slide on or off of the hub 114 of the line head. In FIG. 2C, once the spool 116 is slided past the knobs 122, the knobs spring back under the biasing force of the retention spring. As previously indicated, the knobs retain the spool and button assembly in the line head during normal operation. The biasing force applied by the retention spring, as well as centrifugal forces acting on the retention spring and its knobs when the line head is rapidly spinning, are sufficient to counteract forces experienced during normal operation that would tend to move the spool downward with respect to the line head.

The assembly of the spool 116 and button 130 is removed from the line head (after the line has been depleted for example) in a single movement similar to that used to slide the spool and button assembly on to the hub. A user grasps the button 130 and, assisted by ledge 134 on the outer circumference of the button, pulls down, causing the bottom edge of the spool's hub 117 to deflect the knobs inwardly to the point shown in FIG. 2B. The spool is then free to be pulled off the hub by the user. The user may then replace the spool, if depleted of line, with a spool wound with line. Replacement spool and button assemblies are sold as a unit and wound with a full supply of line so that replenishing line is very easily and quickly accomplished.

Figure 3:
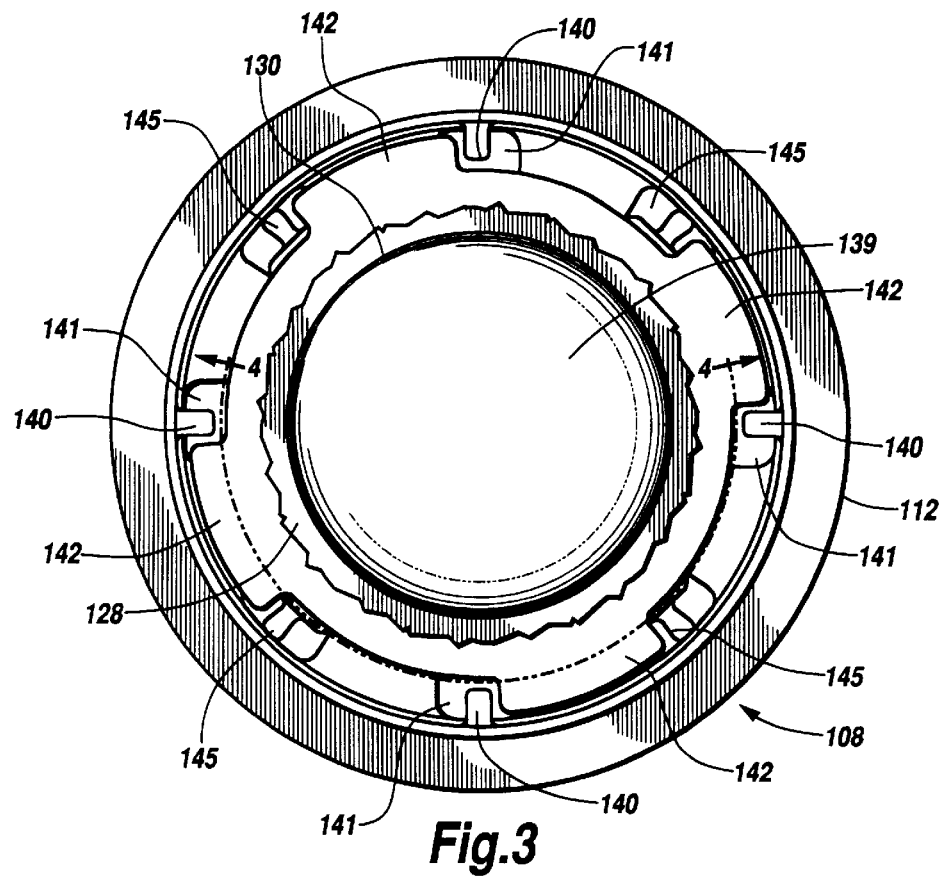
FIG. 3 is a bottom plan view of the line head of FIG. 1 with a portion of a bottom wall of the spool partly removed.
Figure 4:
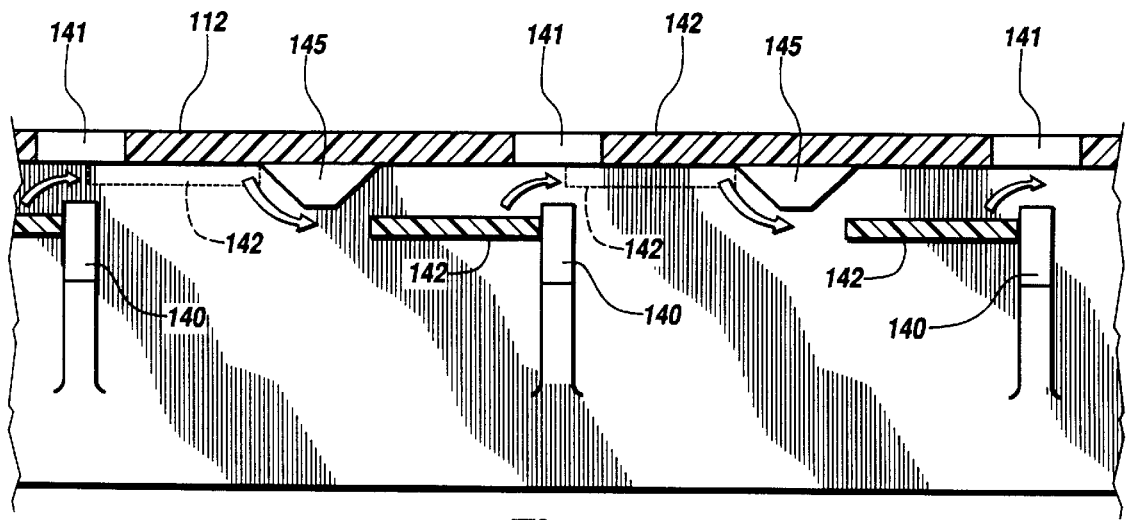
FIG. 4 is a section of the line head illustrated in FIG. 3, taken along Section line 4—4.

Referring now to FIGS. 1, 3 and 4, line head 108 includes an indexing mechanism comprised of a set of stepped detentes that function to pay out a predetermined amount of line in response to the bottom 130 being bumped swiftly against the ground.

In the first operation position, shown on side 126 of line 123 (FIG. 1), spool 116 is held against line head 108 for rotation with the line head by the cooperation of series of tab-like stops 140 projecting radially inwardly from the inner surface of housing 112 and ears 142 projecting radially outwardly from the edge of the upper side wall 134 of the spool 116. When the head starts spinning, the centrifugal force acting over the line outside of the spool moves the ears of the spool 116 against the stops in the hub 114. Rotation of the line head causes the stops 140 to engage ears 142, and thus rotate the spool with the line head. Stops 140 are equally spaced apart and integrally formed with the line head hub 114 and housing 112 during an injection molding process. Openings 141 are caused by the insertion into and retraction from the mold of pins that define the top edge of each stop during the injection molding process. Ears 142 are spaced apart at intervals equal to those of the stops. The ears are integrally formed on the spool during the injection molding process.

To feed or pay out a predetermined length of line from the line head 108 during operation, button 130 is hit swiftly against the ground, moving the spool 116 axially upward from the first operating position to the second or displaced operating position, shown on side 128 of line 123 in FIG. 1. Each ear 142 moves upward and over the top of stop 140, against which it had been held, thus releasing the spool 116 and allowing it to slip on hub 114 as the line head spins. A set of protuberances 144, stepped upwardly and displaced circumferentially from the stops 140, project inwardly from the line head housing in the plane of rotation of the ears when the spool is displaced. Each protuberance is spaced midway between adjacent stops 140. The protuberances stop rotation of the spool while the tap button is held against the ground when it is in the second displaced position, and assist in deflecting the ears 142 downwardly, under the urging of compressed spring 129 (FIG. 1) once the ears have moved past the stops 140. The spool then continues to slip in the first operating position until the ears engage the stops 140. The surfaces of the protuberances 144 are angled and face downwardly to assist in deflecting the ears downwardly toward the first operating position.

The invention has been described in connection with a preferred embodiment. Alterations, modifications, substitutions and omissions may be made in the preferred embodiment without departing from the spirit and scope of the invention as set forth in the appended claims.

What is claimed is:

1. An apparatus comprising:
    a light-weight spool integrally formed of a moldable material, on which is wound a supply of flexible line suitable for cutting vegetation, the spool including,
        a hollow hub portion having an open top end and an open bottom end,
        a top side extending radially outwardly from near the top end of the hub portion, and
        a generally circular solid bottom side extending generally radially outwardly from near the bottom of the hub portion, the bottom side having a ridge with an undercut, the ridge disposed radially outwardly from the open bottom end of the hub portion; and
    an integrally formed, generally cup-shaped button member, the button member including a side wall having an undercut for hooking to the undercut on the ridge on the bottom side of the spool and fixing the button member to the bottom side of the spool, the bottom side of the spool and the button member defining a cavity there between.

2. The apparatus of claim 1 wherein the ridge substantially encircles the open bottom end of the hub portion.

3. An apparatus comprising:
    a light-weight spool integrally formed of a moldable material on which is wound a supply of flexible line suitable for cutting vegetation, the spool including,
        a hollow hub portion having an open top end and an open bottom,
        a top side extending radially outwardly from the top end of the hub portion, and,
        a generally circular solid bottom side extending generally radially outwardly from near the bottom of the hub portion, the bottom side having diametrically opposed first hooking members disposed radially outwardly from the open bottom of the hub portion and having an undercut surface for hooking,
    an integrally formed, generally cup shaped button member, the button member having diametrically opposed second hooking members for hooking to the first hooking members to fix the button member to the bottom side of the spool and thereby define a cavity between the bottom side of the spool and the button member, the cavity extending radially beyond the open bottom of the hub portion of the spool;
    a line head housing having a top wall and a side wall extending downwardly around the spool, the housing including a central, hollow hub on which the spool is mounted for rotation; the line head housing further including:
        means for releasably locking the spool to the housing, the means for releasably locking holding the spool to the housing for rotation with the housing about the axis of rotation when in a locked position and allowing rotation of the spool about the hub when in an released position; and
        means for retaining the spool on the hub for rotation of the spool about the hub, the means for retaining extending radially outwardly from the hub under the spool and into the cavity between the button member and the bottom side of the spool; the means for retaining further including means for releasing the spool in the axial direction in response to application of a force in excess of a predetermined force to the spool in the axial direction.

4. A line head for a flexible line trimmer comprising:
    a spool for storing a supply of flexible line;
    a housing for coupling to a rotary shaft for rotation about an axis, the housing including a hub extending downwardly within a central portion of the housing on which the spool is mounted;
    means for releasably locking the spool against rotation on the hub within the housing, the means for releasably locking holding the spool to the housing for rotation with the housing when in a locked position and for releasing the spool for rotation about the hub when in a released position; and
    a retention member extending radially outwardly from the hub and having an engaging surface for cooperating with the spool to retain the spool on the hub, the engaging surface facing generally toward the housing in a direction oblique to the axis of rotation for enabling the spool to deflect the retention member radially inwardly against a bias as the spool is manually pulled downwardly in the direction of the axis of the hub.

5. The line head of claim 4 wherein the retention member further includes a second engaging surface facing generally away from the housing in a direction oblique to the axis of rotation for enabling deflection of the retention member radially inwardly by axially upward displacement of the spool during manual mounting of the spool onto the hub.

6. The line head of claim 4 wherein the engaging surface cooperates with a bottom side of the spool.

7. The line head of claim 6 wherein the spool includes a button mounted on the bottom side of the spool, spanning an opening in the bottom side of the spool, and defines between the bottom side of the spool and an underside of the button a cavity for accommodating rotational movement of the retention member relative to the spool when the retention member extends beneath the bottom side of the spool.

8. The line head of claim 7 wherein the cavity formed between bottom side of the spool and the button is dimensioned for accommodating movement of the retention member relative to the spool during axially upward displacement and rotation of the spool on the hub for feeding line.

9. The line head of claim 7 wherein the button and the spool are separately fabricated and each includes integrally formed means for connecting one to the other without fasteners.

10. The line head of claim 9 wherein the means for connecting includes an undercut ridge formed on the bottom side of the spool for snapping to an undercut rim formed on the button.

11. The line head of claim 7 wherein the cavity accommodates the retention member during movement of the spool on the hub while feeding line.

12. The line head of claim 4 wherein the means for releasably locking the spool includes stops located between an outer periphery of the spool and an inner surface of the housing, the stops releasing the spool for rotation on the hub through a predetermined angle in response to the spool being displaced axially upwardly.

13. A line head for a flexible line trimmer comprising:

spool for storing a supply of flexible line;

a housing for coupling to a rotary shaft for rotation about an axis, the housing including a hub extending downwardly within a central portion of the housing on which the spool is mounted for rotation; and means for retaining the spool on the hub, the means for retaining including a knob having a first engaging surface facing generally toward the housing in a direction oblique with respect to the axis of rotation for cooperating with the spool to retain the spool on the hub during a normal operation and enabling deflection of the knob inwardly into the hub by downward displacement of the spool on the hub during removal of the spool from the hub.

14. The line head of claim 13 wherein the means for retaining includes a second engaging surface facing generally away from the housing in a direction oblique to the axis of rotation for enabling deflection of the means for retaining inwardly in response to mounting of the spool onto the hub.

15. The line head of claim 13 wherein the means for retaining includes a spring mounted within the hub, the spring having a portion thereof integrally formed into the knob defining the first engaging surface.

16. The line head of claim 15 wherein the spring is a generally "U" shaped spring having two resilient legs, the spring being mounted within a hollow center portion defined within the hub, and wherein the knob is integrally formed on one of the two resilient legs.

17. The line head of claim 16 wherein the other of the two legs has formed thereon a second knob, the second knob defining a second engaging surface facing in a direction oblique to the axis of rotation for cooperating with the spool to retain the spool on the hub during normal operation.

18. The line head of claim 13 wherein the means for retaining extends radially outwardly from the hub beneath the spool, and wherein the spool includes a button extending from a bottom surface thereof for displacing the spool axially upwardly when the button is hit against the ground, the button spanning the means for retaining when extended for accommodating relative rotation of the spool on the hub and the means for retaining.

* * * * *